United States Patent [19]

Stultz et al.

[11] 3,771,986

[45] Nov. 13, 1973

[54] CONTINUOUSLY SKIMMING VISCOUS GLASS

[75] Inventors: James C. Stultz, Lower Burrell; John J. Capellman, Tarentum; Leonard A. Knavish, Pittsburgh, all of Pa.

[73] Assignee: PPG Industries, Inc., Pittsburgh, Pa.

[22] Filed: June 1, 1972

[21] Appl. No.: 258,792

[52] U.S. Cl. .................. 65/134, 65/168, 65/347
[51] Int. Cl. ............................................ C03b 5/20
[58] Field of Search ..................... 65/168, 27, 342, 65/343, 337, 345, 347, 134

[56] References Cited
UNITED STATES PATENTS 3,206,295  9/1965  Mattern ......................... 65/347 X
1,872,477  8/1932  Mambourg ..................... 65/347 X Primary Examiner—Arthur D. Kellogg
Attorney—Russell A. Eberly

[57] ABSTRACT

A silica-rich, volatiles-deficient surface layer is removed from highly viscous glass, near a forming means (rolls or the like). There is used a weir of less-than-usual depth that contains a platinum member that provides a substantially unchanging weir depth; at the same time, Venturi means control the amount of hot gases removed from the glass-melting furnace, to maintain or control the flow of the highly viscous glass. With the invention, it is possible to drain off the silica-rich surface of a highly viscous glass, losing only about 10 percent of the furnace throughput, rather than accepting the higher losses (about 30 percent) required in accordance with previous practices.

11 Claims, 2 Drawing Figures

PATENTED NOV 13 1973

3,771,986

CONTINUOUSLY SKIMMING VISCOUS GLASS

BACKGROUND OF THE INVENTION

1. Field of the Invention This invention relates to the production of formed pieces or articles of glass, and more particularly, to the production of articles of spodumene-type crystallizable glass.

2. Description of the Prior Art In the making by a continuous roll-forming process of articles of spodumene-type crystallizable glass, such as the glass of Petticrew et al. U. S. Pat. No. 3,625,718, it has sometimes hitherto been considered necessary to withdraw from the furnace a considerable proportion of the glass near to the surface of the molten glass in the tank. Glasses of the above-indicated composition contain on the order of 1.6 percent of zinc oxide, a volatile component. A grave problem arises when an attempt is made to melt and form them on a continuous basis. The zinc oxide volatilizes, leaving a zinc-deficient, silica-rich surface layer that must be removed from the glass before it is formed and heat treated to yield a desired crystallized-glass product. If the silica-rich layer is not removed, intolerable cracking develops during a subsequent heat-treating step that is necessary for the development of the desirable crystallized-glass properties.

Prior to the instant invention, there have been at least four ways of dealing with the above-indicated problem.

First, it is possible to remove the silica-rich surface layer after the glass has been continuously roll-formed, by grinding or the like. Although feasible, such a practice is very costly, and it is preferably avoided.

Second, it has been found possible to remove the silica-rich surface layer by draining it and its adjacent glass out through weirs that are relatively deep in comparison to those used in accordance with the present invention. In this practice openings are drilled into the basin walls of the melting furnace in the vicinity of the exit end (near the forming rolls), with glass being drained off through weirs that have notches, the bottoms of which lie about 1-½ inches below the surface of the glass. When this practice is adopted, approximately 30 percent of the throughput of the melting furnace needs to be withdrawn through such weirs in order to obtain a flow of glass that is sufficiently large to be self-sustaining. It is to be remembered that the spodumene-type crystallizable glass, in the vicinity of the forming rolls, is at a viscosity of on the order of 100 to 1,000 poises. It would be substantially easier to remove the surface layer of the glass if the glass were at a viscosity of lower than 100 poises, but with the glass composition mentioned above, and in the process mentioned above, it would do no good to remove the surface layer from the glass while it is at such a viscosity, i.e., at a stage further upstream in the process, since the unwanted silica-rich, volatiles-deficient surface layer would simply then redevelop downstream of the point of such removal.

A third possibility consists in the use of a surface floater member that diverts the silica-rich glass into the edge portions of the ribbon as it is formed, with a view to the removal of such edge portions from the product ribbon by edge trimming or the like. Such a practice is disclosed in co-pending application U. S. Ser. No. 222,627, filed Feb. 1, 1972, assigned to the Applicants' Assignee. Although such a practice has been used with success, difficulties with it sometimes tend to develop. The practice of that invention does not provide any convenient way of adjusting the extent of the diversion action in accordance with changes, when they occur, in the residence time of the molten glass in the glass-melting furnace and in the consequent thickness of the silica-rich, volatiles-deficient layer. In other words, although the invention of that application provides one possible answer to the problem with which we are here concerned, there are occasions that arise when the invention of that application does not provide an adequate answer to the problem; the diversion of silica-rich glass to the edges is inadequate, and too much edge trim is required to produce roll-formed glass devoid of a silica-rich, volatiles-deficient surface layer. At the same time, in the practice of that invention, there is no convenient way, short of taking out the skimmer that it proposes and substituting another, slightly wider one, to correct the situation.

A fourth way of dealing with the problem is to conduct a batch-type operation, i.e., melting and homogenizing the glass, and then draining off its silica-rich surface layer immediately before forming the glass. Those skilled in the art will appreciate that such a process is, like most batch processes, disadvantageous in comparison with smooth, continuous operation whenever the latter can be at all conveniently achieved. Furnace refractories usually last far longer if they are not subjected to the kind of repeated thermal cycling that almost necessarily attends a batch operation.

Many of the features proposed herein are not, of themselves, entirely new. The continuous removal of surface impurities by withdrawing molten glass from the sides of the tank is shown, for example, in Belgian Patent No. 738,626. Dams or weirs have been provided with spillways or notches, to give preferential flow of liquid therethrough, ever since ancient times. The use of platinum and its alloys as long-lived glass-contact materials is shown in U. S. Pat. Nos. 3,230,060 and 3,625,718. The idea of regulating the flow of molten glass by providing electrical heating means near to the molten glass is to be found in U. S. Pat. Nos. 1,118,204; 3,160,492; and 3,580,976. Such prior art does not, however, make obvious our invention.

SUMMARY OF THE INVENTION

A silica-rich, volatiles-deficient surface layer is removed from highly viscous glass, near a forming means (rolls or the like). There is used a weir of less-than-usual depth that contains a platinum member that provides a substantially unchanging weir depth; at the same time Venturi means control the amount of hot gases removed from the glass-melting furnace, to maintain or control the flow of the highly viscous glass. With the invention, it is possible to drain off the silica-rich surface of a highly viscous glass, losing only about 10 percent of the furnace throughput, rather than accepting the higher losses (about 30 percent) required in accordance with previous practices.

DESCRIPTION OF THE DRAWINGS

A complete understanding of the invention may be obtained from the foregoing and following description thereof, taken together with the appended drawings, wherein.

DESCRIPTION OF THE PREFERRED EMBODIMENT

Figure 1:
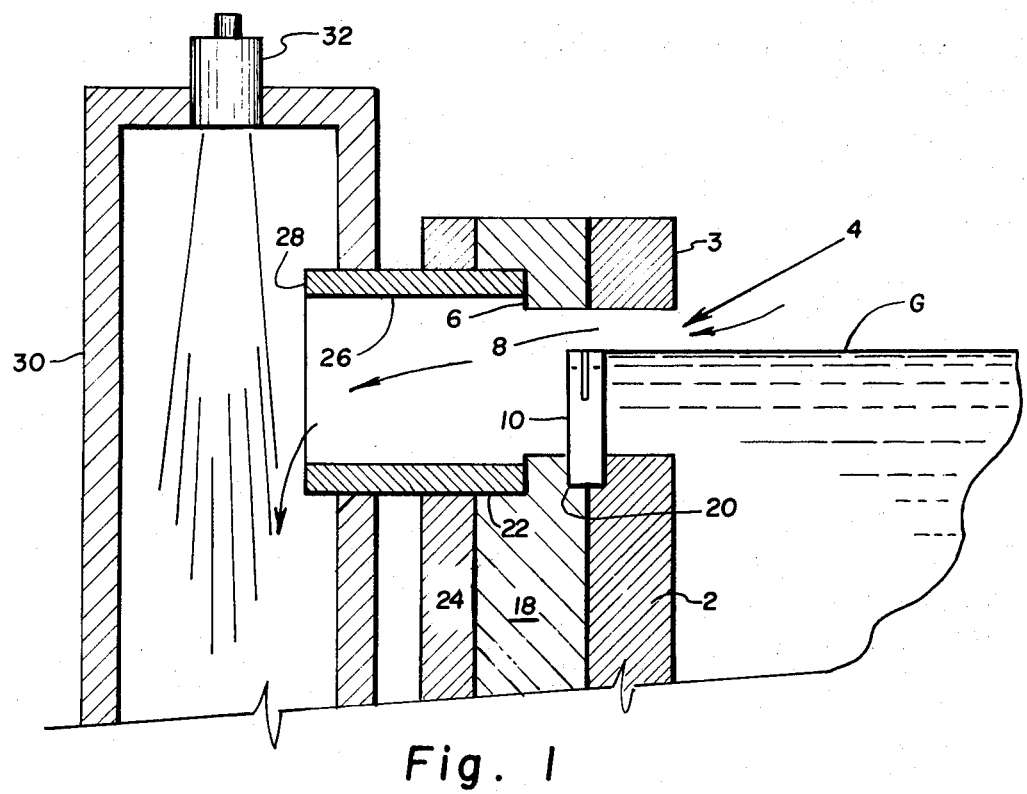
FIG. 1 comprises a schematic elevational section view, indicating the main parts of the apparatus in accordance with the invention, as used in practicing the method of the instant invention.

In accordance with the instant invention, the problem of removing a silica-rich, volatiles-deficient layer from the surface of a bath of molten glass, while the molten glass is at such a temperature that the viscosity of the glass is on the order of 100 to 1,000 poises, is preferably solved by providing a weir with a relatively shallow notch, on the order of one-half inch rather than 1-½ inches as had hitherto previously been used, with the weir being so constructed as to contain a member of platinum or the like that is suitably shaped so as to maintain the depth of the notch at the value indicated above through a run or campaign of substantial extent. At the same time, gases pass from the glass molten furnace through a headspace above the above-mentioned notch in the weir. Those skilled in the art refer to this stream of exiting gas as "sting-out." In accordance with the invention, means are provided that communicate with the above-mentioned headspace and serve, through a Venturi effect, to accelerate the above-mentioned "sting-out" to a desired degree, thereby making it possible to maintain an adequate flow of the very viscous glass involved, despite the relatively small dimension of the notch in the weir. It is taught herein how a burner that operates on compressed air and natural gas may be used for this purpose, though it is apparent that other pressurized gases could be used just as well. The "sting-out" gas is, of course, somewhat hotter than the molten glass flowing through the notch in the weir; thus, by adjusting the flow rate of the "sting-out" gas, i.e., by turning the burner up or down, it becomes possible to control the rate of flow of viscous glass through the notch and thus insure against an undesired freeze-up of such glass, on the one hand, if the glass is relatively too high in viscosity, and also insure against having the glass flowing too rapidly, on the other hand, if the viscosity of the glass is too low. In accordance with the invention, accordingly, it is possible to effect the desired removal of the silica-rich surface layer of the spodumene-type crystal-lizable glass in the vicinity of the forming rolls or other forming means, while at the same time, maintaining at a relatively low value the percentage of the furnace throughput that is thus removed from the furnace. In other words, without the headspace-gas-accelerating means used in accordance with the instant invention, it would be necessary to use a weir notch that is on the order of three times as deep and consequently tolerate glass flows through such notch on the order of three times as high, in order to insure against an unwanted freeze-up of the relatively viscous glass. In comparison, then, with previous practices of the kind that rely upon draining of glass through the basin wall to effect removal of the silica-rich, volatiles-deficient surface layer, the instant invention is substantially more efficient than the practices hitherto known and considered.

Although the invention has been described above particularly with reference to the continuous production of spodumeme-type crystallizable glass, those skilled in the art will readily appreciate how the invention might be applied in the making of soda-lime glass or glass of other compositions. With such glasses, the problem of removing a silica-rich layer while the glass is adjacent to or in the vicinity of a forming apparatus and at a high viscosity, on the order of 100 to 1,000 poises, is somewhat less often encountered than in the continuous forming of crystallizable glass in accordance with a procedure such as that which has been mentioned hereinabove. Those skilled in the art will readily appreciate, however, how such a practice might be adopted with respect to such other glass.

Referring now to FIG. 1, there is shown a bath of molten glass G, which is indicated as being contained within a furnace having a basin wall 2. As indicated hereinabove, the glass G may have a composition of a known type of spodumene-type crystallizable glass, such as that of Petticrew et al. U. S. Pat. No. 3,625,718, namely: 64 to 74 percent $SiO_2$, 15 to 23 percent $Al_2O_3$, 3.3 to 4.8 percent $Li_2O$, 1 to 3.8 percent ZrO, 1.2 to 2.4 percent $TiO_2$, 0 to 2 percent $ZrO_2$, 0 to 2.5 percent MgO, 0 to 2.5 percent CaO, all percentages being by weight. At a location in a furnace containing such glass, or more properly speaking, at a location known in an exit canal thereof that is in the vicinity of forming rolls, being perhaps 20 to 25 inches therefrom, there may be provided, on each side such an exit canal within a brick 3 in the basin wall 2, an opening 4. In the case of a furnace producing 25 to 30 tons per day of such glass, the opening 4 may have a suitable diameter, such as 5 inches. As is indicated in FIG. 1, the opening 4 is shaped so as to contain a countersunk exterior portion 6, for a purpose to be hereinafter more fully described, and to provide also a headspace 8 that serves to permit the passage of "sting-out" gases of the kind hereinabove described.

Figure 2:
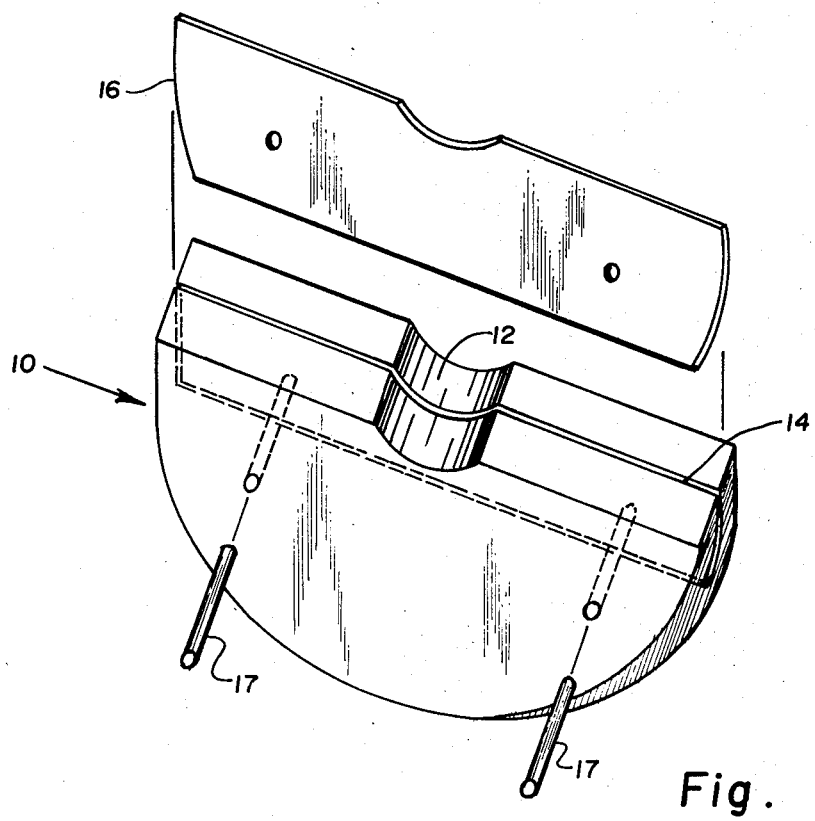
FIG. 2 is a detailed perspective exploded view, illustrating particularly a portion of the apparatus disclosed in FIG. 1.

Set within the countersunk portion 6 of the opening 4, there is provided in accordance with the invention a member 10 more particularly illustrated in FIG. 2.

Shown in FIG. 2 is the member 10, which may be made largely of some suitable material for withstanding contact with glass of the kind mentioned above, such as a zircon refractory.

As seen in FIG. 2, member 10 is generally of a half-moon shape, having in its straight side a cutout portion 12, also of a half-moon shape. Member 10 also has a slot 14, for a purpose hereinafter discussed. The cutout portion 12 may have a radius of one-half inch, and the thickness of the piece 10 may be on the order of 1 inch. Within the slot 14, there is positioned a thin sheet of platinum or platinum-base alloy, preferably about 0.040 inch or more. Satisfactory results have been obtained with the use of a platinum-sheet member 16 made of an alloy of 20 percent rhodium, balance platinum, 0.12 inch thick and shaped similarly to (but smaller than) the member 10, its cutout portion lying initially in alignment with the cutout portion 12 of the piece 10. After a day or two of use, the refractory part of the piece 10 may begin to wear and erode rather badly, and it is intended that the platinum or platinum-rhodium plate serve to maintain the notch at its desired shape and dimensions, i.e., preferably half-round with a radius on the order of one-half inch. One or more suitable pins 17 of zircon refractory pass through the piece 10 and member 16 to secure the latter within the slot 14.

Also shown in FIG. 1 is a support block 18, preferably also made of zircon refractory or other suitable glass-contact material and having therein suitable countersunk or cutout portions 20 and 22. Steel bracing 24 secures the support block 18 into contact with the basin wall 2, and as is shown in FIG. 1, the half-moon member 10 is suitably arranged so as to be held between the support block 18 and the cutout portion 6 of the block 3. Fitting into the cutout portion 22 of the basin block 18, there is provided a suitable member such as a tube of fused silica 26, possibly having such dimensions as 7 inches in outside diameter and 5 inches in inside diameter, with one end 28 of the tube 26 communicating with a plenum member 30 that contains a suitable Venturi means, such as the burner 32. In the example of the instant invention here given, the burner 32 has a diameter of 2 inches, and it is fed with a mixture of natural gas and compressed air at a rate of 600 to 2,850 standard cubic feet per hour, the volumetric flow rate of the air being about ten times that of the natural gas. The flow rate of the mixture may be adjusted to give a desired flow rate of skimmed glass. For example, one may use the rate of 600 standard cubic feet per hour to obtain a glass-removal rate of 0.5 tons per day, or the rate of 2,850 standard cubic feet per hour to obtain a flow of 1.25 tons per day. It is desirable, of course, to minimize the rate of withdrawal of skimmed glass, to the extent that this can be done without impairing unduly the quality of the product glass. Thus, with the burners 32 on each side going at 2,850 standard cubic feet per hour, the glass-removal rate is 2.5 tons per day, or about 10 percent of the total furnace throughput. This high rate will suffice in nearly all circumstances to permit the production of glass of satisfactory quality. Lower rates are desirable, and usually feasible. If the glass being dealt with is of such nature that its volatilization problems are severe, it is possible to use higher glass-removal rates, such as 10 percent of the throughput through each side. In such a case, there would be used higher flow rates through the burners 32 and/or a deeper notch 12.

The instant invention is not to be used in instances wherein the composition of the glass that is being treated is such as to contain over 0.3 weight percent of arsenic trioxide. Arsenic trioxide is well known as a refining agent, and it is often included in at least small proportions in spodumene-type crystallizable-glass compositions. It is also well known, however, e.g., from U. S. Pat. No. 3,625,718, that glass-ceramic materials that contain a substantial amount of arsenic trioxide will attack platinum. Accordingly, the present invention is limited to use with glass compositions that do not contain arsenic trioxide or other materials that promote attack of platinum, at least to any extent so substantial as to interfere with obtaining the desired service life, which should be on the order of 30 days or more. As was indicated above, without the use of the platinum insert 16, the member 10 is likely to fail to maintain its shape in as little as a day or two.

The absolute pressure of the gases in the head-space of the furnace or canal in the vicinity of the forming rolls or the like is, in most instances, on the order of 0.05 to 0.20 inch of water above the atmospheric. Those skilled in the art will understand how it will be advisable to adjust the flow of gas creating the Venturi effect, i.e., flow of gas through the burner 32, in order to maintain the flow of molten glass through the notch 12 and the silica tube 26 at a desired value, despite such changes that may occur in this absolute pressure. If, for example, as the result of more vigorous firing in the furnace, the above-mentioned absolute pressure rises, the desired flow is obtained with a lowered velocity of gas to the burner 32; conversely, a higher gas velocity through the burner 32 is required if the above-mentioned headspace absolute pressure is decreased.

It is possible, of course, to provide additional heat to the vicinity of the member 10 by attaching electrical heads to the insert 16 and causing it to be heated by resistance heating. In most instances, however, such a practice is unnecessary, the necessary skimming flow of glass being obtained without resort to any such expedient. In this regard, it is helpful when working with glass of the specific composition mentioned above, when it is at a viscosity of between 300 and 400 poises, to use for the opening 4 a diameter of about 5 inches, rather than one slightly smaller, say, 4 inches. Such a smaller opening may sometimes not permit an adequate flow of "sting-out" gas, except with the use of such resistance heating, or of inconveniently high gas velocities through the burner 32, or both. On the other hand, if the diameter of the opening 4 is substantially larger than about 5 inches, the flow of "sting-out" gas becomes relatively larger and harder to deal with, and heat is wasted. It is considered impractical to make the diameter of the opening 4 sufficiently large that there will be provided an adequate flow of "sting-out" gas to maintain the desired flow of glass, without resorting to the use of the high-velocity burner 32 or other means for accelerating the flow of headspace gases in the vicinity of the notch 12. A broad range for the diameter of the opening 4 is from 3.5 to 6 inches.

Of course, other relatively slight departures from the specific procedure indicated above might also be practiced in accordance with the instant invention. The bottom of the notch 12 may, for example, be as little as 0.15 inch or as much as 0.9 inch below the surface of the glass G, depending upon the viscosity of the glass, the overall throughput of the forming operation, and the high-velocity capabilities of the burner 32 or other means used to create the Venturi or other desired aspirating effect. It is desired, of course, to avoid having a notch so deep that the flow of molten glass through it becomes uneconomically great, approaching 20 or 30 percent of the throughput of the furnace. There may be times that it is desirable to remove all of the skimmed glass from one side of the furnace, and in this event, it will be desirable, other things being equal, to use a relatively deeper notch and possibly also to provide within a tank a floater or skimmer that serves to direct the surface glass toward the opening 4. Indeed, in a preferred manner of practicing the invention, with the draining being done from both sides, it is usually desirable (but not absolutely essential) to provide within the furnace such a member or such members.

It must be emphasized that the burner 32 must be a relatively high-velocity burner. In working on the scale indicated above, it is usually not possible to achieve a satisfactory aspirating or Venturi effect with a flow less than 600 standard cubic feet per hour. On the other hand, it is usually unnecessary or undesirable for economic reasons to use a gas flow through the burner 32 greater than about 2,850 standard cubic feet per hour. Those skilled in the art will perceive how the invention may be practiced with burners 32 somewhat greater or smaller in diameter than the 2-inch dimension mentioned above. The dimension selected should be adequately co-ordinated with the intended gas throughput to obtain the necessary aspirating effect.

The gases that pass through the burner 32 may be of an desired composition. In most instances, it is least costly to achieve the desired high velocities by the combustion of a hydrocarbon fuel such as oil or natural gas with air, oxygen-enriched air, or the like. The heating that is incident to the combustion takes the products of combustion to a high temperature and causes much expansion of the gas; to achieve equivalent flow rate with materials that are already heated would require substantially larger blowers to deal with the large volumes of gases being handled. In principle, however, nothing would prevent the use of hot air, cold air, steam, or other gas to achieve the desired high velocity.

The instant invention thus provides a convenient way of producing a relatively wide and continuously rolled ribbon of a spodumene-type crystallizable-glass composition. Inasmuch as substantially all of the silica-rich surface scum is removed before the glass passes into the forming rolls, the product ribbon has a substantially lower edge-trim loss, being perhaps only 1 inch or 2 on each edge with a ribbon having a total width of 26 or 28 inches, as compared with losing 4 to 8 inches from each side if an attempt is made to divert the silica-rich surface glass to the ribbon edges. Moreover, as circumstances permit or require, the skimming action can be stepped down or speeded up very conveniently, by increasing or decreasing the flow of gas through the burners 32, without any interruption in the production. In contrast, the changing of a V skimmer is used to divert the silica-rich glass toward the edges of the ribbon would require an interruption in the production.

The glass withdrawn through the notch 12 and the tube 26, although somewhat rich in silica and deficient in more volatile components such as zinc oxide and the alkali-metal oxides, is nevertheless a satisfactory cullet material; it may be reused by being introduced to the feed end of the melting furnace.

For the insert 16, the use of a platinum-rhodium alloy of substantial rhodium content, such as 40 percent, is preferred. Higher rhodium contents give better service life, but there is the offsetting disadvantage that the higher-rhodium alloys are more difficult to machine.

The instant invention may be considered as comprising several features, taken individually or together, as may be indicated in the appended claims.

The concept of providing a weir member with a slot that contains an insert sheet of platinum or platinum-base alloy, preferably an alloy with about 20 to 50 weight percent of rhodium, is one that has general utility, apart from the particular problems that confront one who seeks to remove continuously substantially all of the silica-rich surface layer upon a body of relatively high-melting spodumene-type glass-ceramic material incidental to the continuous forming of a ribbon of such material. To the extent that the concept of such a platinum-containing insert is novel and unobvious, whatever its use in the handling of viscous glassy materials, protection therefor is sought.

Likewise, the concept of using a shallow notch and then using means to accelerate the passage of headspace gases through the vicinity of the notch is one that is broadly useful, regardless of the particular nature or design of the weir member; if desired, a solid member made of the platinum or its alloy, containing no refractory, could conceivably be used; accordingly, protection is sought for this broader concept, without limitation as to the form of the weir member. It is preferable, of course, to use a weir member of the particular design mentioned above.

The acceleration of headspace gases through the vicinity of the notch may conceivably be accomplished in various ways other than the use of a burner pipe for its Venturi effect; the provision of vacuum means, for one, comes to mind as a conceivable alternative. It is especially desirable that such means be located outside of the tank. The inside of the tank is a difficult environment, being of a kind that often necessitates the use of relatively costly equipment if dependable service is to be expected; moreover, means located within the tank are likely to upset the process.

Apart from the novelty and unobviousness of the apparatus features discussed above, there is also the matter of the obviousness of using such features in the process of skimming the surface of rather highly viscous glass, i.e., having a viscosity of about 100 to 1,000 poises. It is considered novel to effect such skimming of such viscous glass while enjoying the benefit of the relatively low glass-loss or glass-removal rate that is to be obtained when the notch used is shallow, i.e., possibly as little as 0.15 inch but preferably on the order of 0.3 to 0.9 inch, rather than 1.5 inches or more. In particular, there are advantages that attend the practice of controlling the respective flow rates through the notch or notches and the forming means so as to obtain the low losses (total for both sides of about 10 percent of throughput or less) indicated herein as being achievable, and further advantages attend the practice of regulating the aspiration effect to maintain the flow of glass through the notch at a substantially constant value, regardless of such other changes as may develop in the operating parameters of the process.

While we have shown and described herein a certain embodiment of our invention, we intend to cover as well any change or modification therein which may be made without departing from its spirit and scope.

We claim:

1. Apparatus for making glass comprising
   a. a container for molten glass having walls and a roof, at least one of said walls having an opening therethrough at an elevation at which the top surface of molten glass in said container may be maintained, and said roof spaced above said elevation providing a headspace above said molten glass, said headspace containing gases;
   b. a plenum in communication with said container through said opening extending through said wall at an elevation such that said opening embraces a portion of said headspace and a portion of said molten glass, said opening providing means for the flow of molten glass and headspace gases from said container to said plenum;
   c. a weir positioned in said opening for controlling the flow of molten glass from said container to said plenum; and
   d. said plenum being provided with means for accelerating the flow of headspace gases through said opening in the vicinity of said weir for causing molten glass to flow over said weir to said plenum, and said plenum having means to receive said molten glass and means for discharging said headspace gases.

2. The apparatus as defined in claim 1 wherein said weir member comprises 1. a refractory piece having at its upper portion a lip containing a notch through which molten glass preferentially flows when passing over said lip, said lip further having a slot extending transversely with respect to said opening and with respect to intended flow of said molten glass through said opening,
2. a sheet-like insert piece positioned within said slot, said insert piece comprising material selected from the group consisting of platinum and platinum-base alloys, and said insert having an edge substantially in the form of said notch.

3. Apparatus as defined in claim 2 wherein said opening has a diameter of the order of from 3.5 to 6 inches and bottom of said notch of said weir is located about 0.15 to 0.9 inch below the elevation at which the top surface of molten glass in said container may be maintained.

4. Apparatus as defined in claim 3, further characterized in that said insert piece is made of a platinum-base alloy containing about 20 to 50 weight percent of rhodium.

5. Apparatus as defined in claim 3, characterized in that said means for accelerating said headspace gases comprises a high-velocity burner located in a conduit communicating with said opening and serving to aspirate headspace gases through said notch.

6. Apparatus as defined in claim 5, further characterized in that said insert piece is made of a platinum-base alloy containing about 20 to 50 percent of rhodium.

7. A method for making glass comprising
a. melting a glass composition within a container to form molten glass having a silica-rich surface layer, said molten glass having a viscosity of from about 100 to 1,000 poises
b. providing headspace gases above the surface of said molten glass in said container
c. withdrawing a surface portion of said molten glass and a portion of said headspace gases continuously through an opening in a side of said container over a weir positioned substantially immediately below the surface of said molten glass, and
d. accelerating the flow of headspace gases through said opening causing molten glass to flow over said weir and discharging said accelerated headspace gases and said portion of molten glass after flowing from said container.

8. A method as defined in claim 7, further characterized in that said accelerating is done by blowing gases in a high-velocity jet within a conduit that communicates with headspace gases passing within the vicinity of said notch so as to accelerate said headspace gases by aspiration.

9. A method as defined in claim 8, characterized by the further feature of regulating the rate of flow of gases in said jet in accordance with the flow of molten glass through said notch so as to maintain the latter substantially constant.

10. A method as defined in claim 7, characterized in that molten glass is withdrawn through at least one opening in said passage while at the same time other portions of said molten glass having said silica-rich surface layer removed from them are continuously removed from said passage and subjected to roll-forming to obtain a product ribbon of glass, the amount per unit time of said removed from said opening being less than 10 percent of the amount of glass per unit time transformed in said product ribbon.

11. A method as defined in claim 10, characterized by the further feature of regulating the rate of flow of gases in said jet in accordance with the flow of molten glass through said notch so as to maintain the latter substantially constant.

* * * * *